United States Patent Office 3,463,812
Patented Aug. 26, 1969

3,463,812
PROCESS FOR PREPARING DIALKALI METAL IMINODIACETATE
Jon C. Thunberg, Amherst, and James J. Hegarty, Nashua, N.H., assignors to W. R. Grace & Co., New York, N.Y., a corporation of Connecticut
No Drawing. Filed Nov. 17, 1967, Ser. No. 683,772
Int. Cl. C07c 85/12, 85/00
U.S. Cl. 260—534          8 Claims

ABSTRACT OF THE DISCLOSURE

In abstract, this invention is directed to a process for preparing dialkali metal salts of iminodiacetate from methylenebisiminodiacetonitrile, said process comprising heating said methylenebisiminodiacetonitrile with an aqueous alkali metal hydroxide solution, freeing said solution of ammonia, and separating, washing, drying, and recovering the precipitated dialkali metal iminodiacetate, all as recited hereinafter.

---

This invention is in the field of dialkali metal iminodiacetate preparation.

Prior art methods for preparing alkali metal iminodiacetates are disclosed in U.S. Patents Nos. 2,895,989 and 3,153,668.

In summary, this invention is directed to a process for preparing dialkali metal iminodiacetate from methylenebisiminodiacetonitrile, said process comprising: (a) forming a reaction mixture in a reaction zone, said mixture consisting essentially of methylenebisiminodiacetonitrile, an alkali metal hydroxide, and water, by adding: (i) methylenebisiminodiacetonitrile; and (ii) an aqueous alkali metal hydroxide solution, said hydroxide solution being about 1–40 normal with respect to OH⁻ ion, to said reaction zone, said methylenebisiminodiacetonitrile being added at a rate of about 0.05–0.25 mole per mole of said alkali metal hydroxide; (b) forming a hydrolyzate, said hydrolyzate consisting essentially of dialkali metal iminodiacetate and water, by heating said reaction mixture in said reaction zone at a temperature of about 70–110° C. while maintaining the pressure within said zone within the range of about 3–30 pounds per square inch absolute until the hydrolyzate is substantially free of ammonia; (c) preparing a concentrated aqueous system, said concentrated aqueous system consisting essentially of precipitated dialkali metal iminodiacetate, and a concentrated mother liquor, said concentrated mother liquor consisting essentially of water and dissolved dialkali metal iminodiacetate by vaporizing water from said hydrolyzate until the total solid content, said total solid consisting essentially of dissolved dialkali metal iminodiacetate and precipitated dialkali metal iminodiacetate, of the resulting concentrated aqueous system is about 40–95% of the total weight of said concentrated aqueous system; (d) separating the precipitated dialkali metal iminodiacetate from the concentrated mother liquor; (e) washing the separated dialkali metal iminodiacetate with about 0.1–1.0 parts of a saturated aqueous dialkali metal iminodiacetate solution per part of separated dialkali metal iminodiacetate; and (f) drying the washed dialkali metal iminodiacetate at about 25–150° C. for about 1–300 minutes, and recovering the thus dried dialkali metal iminodiacetate. (Said dialkali metal iminodiacetate can be recovered in a substantially anhydrous form, as a hydrate, as a mixture of anhydrous and hydrated dialkali metal iminodiacetate, or as a mixture of hydrates depending upon drying temperature and drying time.)

In preferred embodiments of the process described in the above summary:
(1) The alkali metal hydroxide is sodium hydroxide;
(2) The alkali metal hydroxide is potassium hydroxide;
(3) The alkali metal hydroxide is lithium hydroxide;
(4) The reaction mixture is boiled in the reaction zone at substantially atmospheric pressure;
(5) Ammonia is stripped from the heated reaction zone by passing a stream of inert gas through said reaction mixture; and
(6) The ammonia vaporized from the reaction zone is recovered.

Another preferred embodiment is directed to a process for preparing an aqueous solution of a dialkali metal salt of iminodiacetate, said process comprising: (a) heating a mixture comprising about one part of methylenebisiminodiacetonitrile, about 3–20 parts of water, and about 0.8–1.1 parts of an alkali metal hydroxide to about 70–110° C. for about 3–100 minutes; and (b) recovering the resulting aqueous solution of said dialkali metal salt.

Where precipitating a dialkali metal iminodiacetate from solution, it is, of course, necessary that the concentration of said iminodiacetate be sufficiently great to exceed the solubility limit of said iminodiacetate. For example, the solubility of disodium iminodiacetate in water is about 23% by weight (based on the total weight of solution—water plus disodium iminodiacetate) at about 25° C. Thus, substantially no disodium iminodiacetate is precipitated from an aqueous solution of said iminodiacetate until the concentration of said solution exceeds about 23%.

It is surprising and completely unexpected that dialkali metal iminodiacetate (NH(CH₂COOM)₂) rather than tetraalkali metal methylenebisiminodiacetate $$CH_2(N(CH_2COOM)_2)_2,$$

where "M" is an alkali metal ion, is formed in the process of this invention. The reason for this surprising and unexpected result is not understood.

Although the process of this invention is neither dependent on nor bound by the following theory, it is believed that the chemical equations set forth infra represent the reactions involved in said process:

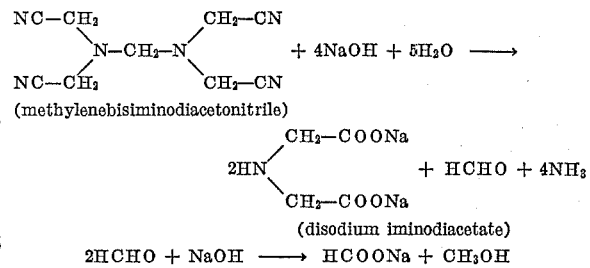

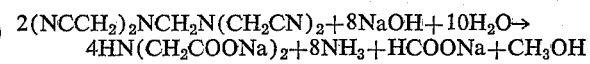

It is also believed that the two equations presented above can be represented by the following overall equation:

$$2(NCCH_2)_2NCH_2N(CH_2CN)_2 + 8NaOH + 10H_2O \rightarrow$$
$$4HN(CH_2COONa)_2 + 8NH_3 + HCOONa + CH_3OH$$

We have found that ammonia can be stripped from a system prepared from water, an alkali metal hydroxide, and methylenebisiminodiacetonitrile by: (a) boiling said system; (b) heating said system under reduced pressure (e.g., about 1–14 pounds per square inch absolute); or (c) passing a stream of an inert gas through said system while maintaining said system at about 60–110° C. By inert gas is meant any gas which will not react with a component of the system (e.g., gaseous HCl, CO₂, or H₂S which would react with said system are not inert gases). Inert gases include nitrogen, argon, helium, hydrogen, methane, ethane, and the like. However, we prefer to use inert gases such as nitrogen, argon, helium, and the like which are neither flammable nor toxic. Obviously, it would be illogical to attempt to strip ammonia from the system with a stream of ammonia vapor. A stream of steam has been used with excellent results. Other inert gases will, as a consequence of the instant disclosure, be readily apparent to those skilled in the art.

The instant invention will be better understood by referring to the following specific but nonlimiting examples. It is understood that said invention is not limited to these examples which are offered merely as illustrations, and it is also understood that modifications can be made without departing from the spirit and scope of the invention.

EXAMPLE I

A 202.2 gram (1.0 mole) portion of methylenebisiminodiacetonitrile was added to a solution of 165 grams (4.12 moles) of sodium hydroxide in 2 liters of water while stirring the aqueous sodium hydroxide solution and while maintaining the temperature of said solution at about 90° C. The methylenebisiminodiacetonitrile was added over a period of about 30 minutes. The resulting mixture was boiled, at atmospheric pressure, until said mixture was substantially free of ammonia, thereby to form a product solution—an aqueous disodium iminodiacetate solution. Boiling the product solution was continued until the total solid content of the resulting concentrated aqueous system (slurry) was about 55% of the total weight of said concentrated aqueous system, said total solid consisting essentially of precipitated disodium iminodiacetate and dissolved disodium iminodiacetate plus a small amount of dissolved sodium hydroxide. The precipitated solid disodium iminodiacetate was separated by filtration, washed with about 0.3 part of a saturated solution of disodium iminodiacetate per part of said separated solid disodium iminodiactate, dried at room temperature by contacting with a flowing stream of air (flow rate about 15 liters per hour) for 100 minutes. The thus dried product, disodium iminodiacetate hexahydrate, weighed 507 grams, representing a conversion (one pass yield) of about 89% of theory based on the methylenebisiminodiacetonitrile charged.

EXAMPLE II

The general procedure of Example I was repeated; however, in this instance, the mixture formed by adding methylenebisiminodiacetonitrile to the sodium hydroxide solution was not concentrated by further boiling after substantially all of the ammonia had been expelled. The final weight of the product solution (an aqueous disodium iminodiacetate solution) was 2000 grams. Titration of an aliquot of said product solution with a standard solution of copper (II) chloride showed that said product solution contained 17.6% disodium iminodiacetate corresponding to a conversion (one pass yield) of 99.5% of theory based on the methylenebisiminodiacetonitrile charged.

EXAMPLE III

The general procedure of Example I was repeated; however, in this instance the procedure was modified by boiling the product solution until the total solid concentration thereof reached 58%—said product solution being converted to a product slurry because of the precipitation of disodium iminodiacetate was separated by filtration, dried at about 60° C. and dried under vacuum (about 1 pound per square inch absolute). The thus dried solid which was identified as disodium iminodiacetate monohydrate weighed 371 grams, corresponding to a conversion of 95% of theory.

EXAMPLE IV

A soltuion of 43 grams (1.08 moles) of sodium hydroxide dissolved in 110 grams of water was heated to 75° C. in a four necked flask equipped with a stirrer, an inlet dip tube for a nitrogen purge, said dip tube extending well beneath the surface of the liquid in said flask, a distillation head, and a thermometer. The sodium hydroxide solution in the four necked flask was stirred while adding thereto, over a period of about 30 minutes, 20.2 grams (0.1 mole) of methylenebisiminodiacetonitrile while maintaining the temperature of the material within the four necked flask at about 95° C. and while sweeping nitrogen at a rate of about 0.5 liter per minute through the liquid in the four necked flask. After adding the methylenebisiminodiacetonitrile to the flask, the flask and its contents were heated until no further ammonia was evolved (i.e., for a period of about 100 mniutes). A sample of liquor was withdrawn from the flask and analyzed by gas chromatography. Said liquor was found to contain about 0.4% methanol. The total methanol in the solution was equal to 0.56 grams (0.175 mole) representing a conversion (one pass yield) of about 35% based on the overall equation presented supra.

A substantial portion of the methanol which was formed by the above reactions was swept from the system by the nitrogen sweep gas.

The solution volume was then reduced to 70 ml. and an additional 20 grams (0.5 mole) of sodium hydroxide was added to the reaction mixture remaining in the four necked flask. This resulted in the formation of a solid precipitate. The precipitate was recovered by filtration, washed with a saturated solution of disodium iminodiacetate, dried at 75° C. at about 2 pounds per square inch absolute pressure for about 48 hours. The recovered solid weighed 25 grams and represented a conversion of about 64% of theory based on the dried material being the monohydrate. A sample of the dried material was analyzed by nuclear magnetic resonance in $D_2O$; the only organic material present was found to be disoduim iminodiacetate.

In other runs, the precipitated disodium iminodiacetate was recovered by centrifugation, and in still other runs this product was recovered by decantation, or a combination of decantation and centrifugation, or a combination of decantation and filtration.

EXAMPLE V

A solution of 43 grams (1.08 moles) of potassium hydroxide was dissolved in 150 ml. of water and heated to boiling. A 20.2 gram (0.1 mole) portion of methylenebisiminodiacetonitrile was added to the boiling potassium hydroxide solution over a period of about 15 minutes. The resulting mixture was boiled for an additional period of about 5 minutes and the resulting potassium iminodiacetate solution was recovered.

EXAMPLE VI

The general procedure of Example V was repeated; however, in this instance boiling was avoided, and the alkali metal hydroxide was sodium hydroxide. The sodium hydroxide - water - methylenebisiminodiacetonitrile mixture was heated to about 93–95° C. The result obtained in this run was substantially the same as that of Example V except that the resulting sodium iminodiacetate solution contained a trace of ammonia.

Dialkali metal iminodiacetates prepared by the process of this invention have been used with excellent results as intermediates in the preparation of acyliminodiacetates, these acyliminodiacetates are useful as surfactants and cleansing additives for toothpowders and pastes, shampoos and cleansing compounds. These metal iminodiacetates may also be converted to the diacids and incorporated into polyester and polyamide compositions.

Aqueous solutions of dialkali metal iminodiacetates prepared by the process of this invention have been used with excellent results as components in liquid rug cleaners, shaving creams, and the like either "as is" or after conversion to long chain acyliminodiacetates by treatment with an organic acid chloride.

As used herein, the term "percent (%)," unless otherwise defined where used, means parts per hundred by weight and the term "parts" as used herein, unless otherwise defined where used, means parts by weight.

It will, as a result of our disclosure, be readily apparent to those skilled in the art that dialkali metal iminodiacetate solutions (or slurries) prepared according to the method of our invention will contain free (unreacted) alkali metal hydroxide in addition to water and dialkali metal iminodiacetate if an excess of said alkali metal hydroxide is charged into a reaction system (said system being prepared by mixing water, alkali metal hydroxide, and methylenebisiminodiacetonitrile). As used in this paragraph "an excess of said alkali metal hydroxide" means any amount of said hydroxide exceeding 4 moles per mole of said methylenebisiminodiacetonitrile.

We claim:

1. A process for preparing dialkyli metal iminodiacetate from methylenebisiminodiacetonitrile, said process comprising
   (a) forming a reaction mixture in a reaction zone, said mixture consisting essentially of methylenebisiminodiacetonitrile, an alkali metal hydroxide, and water, by adding; (i) methylenebisiminodiacetonitrile; and (ii) an aqueous alkali metal hydroxide solution, said hydroxide solution being about 1–40 normal with respect to OH$^-$ ion, to said reaction zone, said methylenebisiminodiacetonitrile being added at a rate of about 0.05–0.25 mole per mole of said alkali metal hydroxide;
   (b) forming a hydrolyzate, said hydrolyzate consisting essentially of dialkali metal iminodiacetate and water by heating said reaction mixture in said reaction mixture in said reaction zone at a temperature of about 70–110° C. while maintaining the pressure within the range of about 3–30 pounds per square inch absolute until the hydrolyzate is substantially free of ammonia;
   (c) preparing a concentrated aqueous system, said concentrated aqueous system consisting essentially of precipitated dialkali metal iminodiacetate, and a concentrated mother liquor, said concentrated mother liquor consisting essentially of water and dissolved dialkali metal iminodiacetate, by vaporizing water from said hydrolyzate until the total solid content, said total solid consisting essentially of dissolved dialkali metal iminodiacetate and precipitated dialkali metal iminodiacetate, of the resulting concentrated aqueous system is about 40–95% of the total weight of said concentrated aqueous system, said total solid consisting essentially of precipitated dialkali metal iminodiacetate, plus dissolved dialkali metal iminodiacetate;
   (d) separating the precipitated dialkali metal iminodiacetate from the concentrated mother liquor;
   (e) washing the separated dialkali metal iminodiacetate with about 0.1–1.0 parts of a saturated aqueous dialkali metal iminodiacetate solution per part of separated dialkali metal iminodiacetate; and
   (f) drying the washed dialkali metal iminodiacetate at about 25–150° C. for about 1–3000 minutes, and recovering the thus dried dialkali metal iminodiacetate 2. The process of claim 1 in which the alkali metal hydroxide is sodium hydroxide.

3. The process of claim 1 in which the alkali metal hydroxide is potassium hydroxide.

4. The process of claim 1 in which the alkali metal hydroxide is lithium hydroxide.

5. The process of claim 1 in which the reaction mixture is boiled in the reaction zone at substantially atmospheric pressure.

6. The process of claim 1 in which ammonia is stripped from the heated reaction mixture in the reaction zone by passing a stream of inert gas through said reaction zone.

7. The process of claim 1 in which the ammonia vaporized from the reaction zone is recovered.

8. A process for preparing an aqueous solution of a dialkali metal salt of iminodiacetate, said process comprising: (a) heating a mixture comprising about one part of methylenebisiminodiacetonitrile, about 3.0–20 parts of water, and about 0.8–1.1 parts of an alkali metal hydroxide to about 70–110° C. for about 3–100 minutes; and (b) recovering the resulting aqueous solution of said dialkali metal salt.

References Cited

UNITED STATES PATENTS

| | | | |
|---|---|---|---|
| 2,511,487 | 6/1950 | Thomson | 260—534 XR |
| 2,860,164 | 11/1958 | Kroll et al. | 260—534 XR |
| 2,895,989 | 7/1959 | Sexton | 260—534 |
| 3,153,668 | 10/1964 | Sexton | 260—534 |

LORRAINE A. WEINBERGER, Primary Examiner

ALBERT P. HALLUIN, Assistant Examiner